United States Patent
Gandhi

(10) Patent No.: US 10,034,149 B2
(45) Date of Patent: Jul. 24, 2018

(54) SYSTEM AND METHOD FOR PROVIDING HOME NODE B GATEWAY REDUNDANCY IN A NETWORK ENVIRONMENT

(71) Applicant: CISCO TECHNOLOGY, INC., San Jose, CA (US)

(72) Inventor: Indermeet Singh Gandhi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 152 days.

(21) Appl. No.: 15/059,082

(22) Filed: Mar. 2, 2016

(65) Prior Publication Data
US 2017/0257810 A1    Sep. 7, 2017

(51) Int. Cl.
| | |
|---|---|
| H04W 4/00 | (2018.01) |
| H04W 4/06 | (2009.01) |
| H04L 29/06 | (2006.01) |
| H04W 88/12 | (2009.01) |
| H04W 36/22 | (2009.01) |
| H04L 29/12 | (2006.01) |

(52) U.S. Cl.
CPC ............ *H04W 4/06* (2013.01); *H04L 63/00* (2013.01); *H04W 88/12* (2013.01); *H04L 61/2015* (2013.01); *H04W 36/22* (2013.01)

(58) Field of Classification Search
CPC ...... H04W 36/30; H04W 4/06; H04L 61/2007
USPC ........................................................ 370/331
See application file for complete search history.

(56) References Cited

U.S. PATENT DOCUMENTS

| | | |
|---|---|---|
| 7,652,984 B1 | 1/2010 | Kotecha |
| 8,582,544 B2 | 11/2013 | Qiu et al. |
| 8,654,709 B2 | 2/2014 | Centonza et al. |
| 8,687,556 B2 | 4/2014 | Eipe et al. |
| 8,693,367 B2 | 4/2014 | Chowdhury et al. |
| 8,750,098 B2 | 6/2014 | Fan et al. |
| 9,173,155 B2 | 10/2015 | Kamalaraj et al. |
| 9,351,207 B2 | 5/2016 | Gorey et al. |
| 2010/0075698 A1 | 3/2010 | Rune |

(Continued)

FOREIGN PATENT DOCUMENTS

WO    2013/009892    1/2013

OTHER PUBLICATIONS

"IP in IP Encapsulation," RFC Sourcebook; Published on or about Oct. 12, 2004; 5 pages.

(Continued)

*Primary Examiner* — Christopher R Crompton
(74) *Attorney, Agent, or Firm* — Patterson + Sheridan, LLP

(57) ABSTRACT

An example method is provided and may include configuring a Home Node B (HNB) with a plurality of Radio Network Controller (RNC) identifiers (IDs), wherein each global RNC ID is associated with one of a plurality of HNB gateways (HNB-GWs); broadcasting a first UTRAN cell ID (UC-ID) by the HNB when the HNB is served by a first HNB-GW; and switching the broadcasting from the first UC-ID to a second UC-ID and re-parenting the HNB to a second HNB-GW, when the HNB loses connectivity with the first HNB-GW. In at least one case, the method can further include identifying, when the HNB loses connectivity with the first HNB-GW and prior to the re-parenting, the second HNB-GW from the plurality of HNB gateways based on a weight factor assigned to the second HNB-GW.

20 Claims, 5 Drawing Sheets

(56) References Cited

U.S. PATENT DOCUMENTS

| | | | |
|---|---|---|---|
| 2011/0075553 A1* | 3/2011 | Rahman | H04L 43/0811 |
| | | | 370/221 |
| 2011/0158171 A1* | 6/2011 | Centonza | H04L 12/2856 |
| | | | 370/328 |
| 2011/0171979 A1 | 7/2011 | Rune | |
| 2012/0023360 A1 | 1/2012 | Chang et al. | |
| 2012/0057496 A1 | 3/2012 | Jin et al. | |
| 2013/0163424 A1 | 6/2013 | Goerke et al. | |
| 2014/0153439 A1* | 6/2014 | Nuss | H04W 24/02 |
| | | | 370/254 |
| 2014/0177434 A1 | 6/2014 | Cartmell et al. | |
| 2017/0063671 A1 | 3/2017 | Gandhi | |

OTHER PUBLICATIONS

"Tomorrow Starts Here," Presentation by Djordje Vulovic, Cisco Connect, Apr. 2-4, 2014, Split, Croatia; 33 pages.
"Managing Groups and ID Pools," Cisco RAN Management System Administration Guide, Release 4.x, Cisco Systems, Inc., Jul. 22, 2014; 46 pages.
"ETSI TS 125 467 V13.0.0 (Jan. 2016) Technical Specification: Universal Mobile Telelecommunications System (UMTS); UTRAN architecture for 3G Home Node B (HNB); Stage 2 (3GPP TS 25.467 version 13.0.0 Release 13)," ETSI, 650 Route des Lucioles F-06921 Sophia Antipolis Cedex—France; Jan. 2016, 93 pages.
"ETSI TS 132 583 V13.0.0 (Feb. 2016) Technical Specification: Universal Mobile Telecommunications System (UMTS); LTE; Telecommunication management; Home Node B (HNB) Operations, Administration, Maintenance and Provisioning (OAM&P); Procedure flows for Type 1 interface HNB to HNB Management System (HMS) (3GPP TS 32.583 version 13.0.0 Release 13)," ETSI, 650 Route des Lucioles F-06921 Sophia Antipolis Cedex—France; Feb. 2016, 22 pages.
"ETSI TS 133 320 V13.0.0 (Jan. 2016) Technical Specification: Universal Mobile Telecommunications System (UMTS); LTE; Security of Home Node B (HNB)/Home evolved Node B (HeNB) (3GPP TS 33.320 version 13.0.0 Release 13)," ETSI, 650 Route des Lucioles F-06921 Sophia Antipolis Cedex—France; Jan. 2016, 43 pages.
"Cell ID," from Wikipedia, the Free Encyclopedia, Jan. 26, 2016, 3 pages.
"Cisco Universal Small Cell Geo-Redundancy Feature Description; Document Version: 1.0," Cisco Systems, Inc., Jun. 9, 2015; 10 pages.
Kybett, Richard, et al., "Multistandard Transceiver IC enabling low cost Femtocell deployment," Technical Whitepaper, Lime Microsystems, Published on or about Jul. 18, 2009; 7 pages.
"IP in IP," from Wikipedia, the Free Encyclopedia, Sep. 9, 2015; 4 pages.
"Femtocell," from Wikipedia, the Free Encyclopedia, Jan. 31, 2016; 12 pages.
"Cisco SON Automated Neighbor Relations for Heterogeneous Networks (HANR-U)," Cisco Systems, Inc., Aug. 2013, 2 pages.
"3GPP UMTS HNB IMS Architectures," conningtech.files. wordpress.com, Jan. 21, 2016; 10 pages.
"TR-069 CPE WAN Management Protocol, Issue: 1 Amendment 5, Issue Date Nov. 2013, CWMP Version 1.4," Broadband Forum Technical Report, Nov. 2013, © The Broadband Forum. All Rights Reserved; 228 pages.
"TR-196 Femto Access Point Service Data Model, Issue: 2, Issue Date Nov. 2011," Broadband Forum Technical Report, © The Broadband Forum. All Rights Reserved; 46 pages.
"ETSI-TS-124-301 V9.4.0 (Oct. 2010) Technical Specification: Universal Mobile Telecommunications System (UMTS); LTE; Non-Access-Stratum (NAS) protocol for Evolved Packet System (EPS); Stage 3 (3GPP TS 24.301 version 9.40 Release 9)," ETSI $3^{rd}$ Generation Partnership Project, European Telecommunications Standards Institute, Oct. 2010, Section 5.5.3.2.4, pp. 96-98.
"ETSI-TS-136-300 V11.9.0 (Mar. 2014) Technical Specification: LTE; Evolved Universal Terrestrial Radio Access (E-UTRA) and Evolved Universal Terrestrial Radio Access Network E-UTRAN); Overall description; Stage 2 (3GPP TS 36.300 version 11.9.0 Release 11)," ETSI $3^{rd}$ Generation Partnership Project, European Telecommunications Standards Institute, Mar. 2014, Section 7-10, pp. 56-95).
"3GPP TS 36.413 V13.0.0 (Jun. 2015) Technical Specification Group Radio Access Network; Evolved Universal Terrestrial Radio Access Network (E-UTRAN); 51 Application Protocol (S1AP) (Release 13)," $3^{rd}$ Generation Partnership Project, European Telecommunications Standards Institute, Jun. 2015, 302 pages.
"Scalable Offloading and Security for 3G/LTE Small Cell Networks," Communications Technologies, Hong Kong Applied Science and Technology Research Institute Company Limited, Aug. 11, 2015, 2 pages.
"3GPP TS 36.300 V13.0.0 (Jun. 2015) Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," $3^{rd}$ Generation Partnership Project, European Telecommunications Standards Institute, Jun. 2015, 254 pages.

* cited by examiner

SYSTEM AND METHOD FOR PROVIDING HOME NODE B GATEWAY REDUNDANCY IN A NETWORK ENVIRONMENT

TECHNICAL FIELD

This disclosure relates in general to the field of communications and, more particularly, to a system and method for providing Home Node B (HNB) gateway redundancy in a network environment.

BACKGROUND

Networking architectures have grown increasingly complex in communication environments. For example, small cells have gained notoriety due to their capabilities to connect wireless devices to a network. In general terms, small cell radio access points, such as Home eNode Bs (HNBs), can operate in a licensed spectrum to connect user equipment to the network, often using broadband connections. For a mobile operator, small cell radio access points can offer improvements to both coverage and capacity, which is particularly applicable to indoor networking environments where macro cell networks typically suffer coverage limitations. Small cell radio access points can also offer an alternative networking architecture to enable scalability challenges to be addressed. In particular, there are significant challenges in managing ambiguity and signaling traffic in cases of small cell gateway failures for networks having redundant small cell gateway configurations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
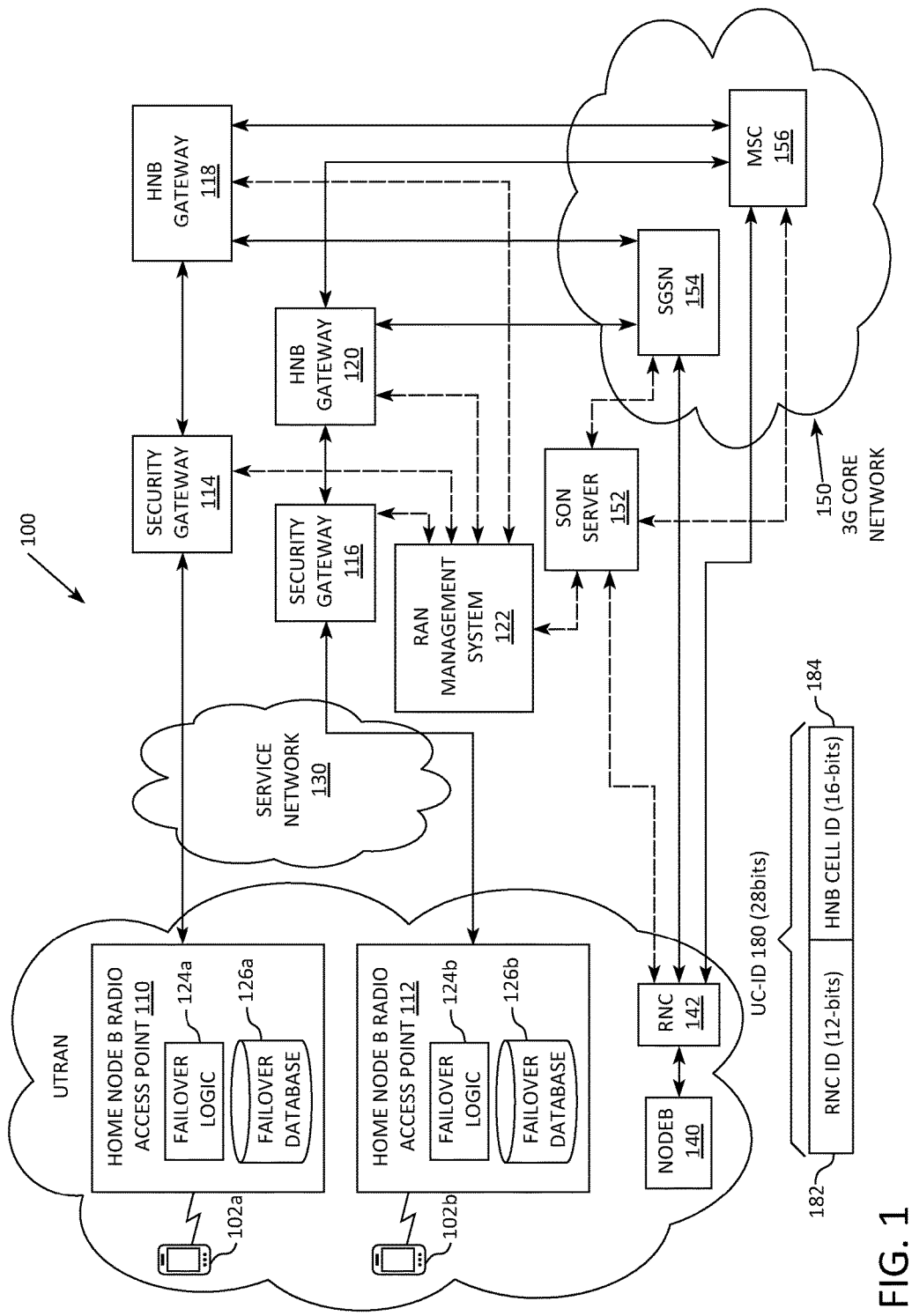
FIG. 1 is a simplified block diagram illustrating an exemplary communication system to facilitate providing HNB gateway (HNB-GW) redundancy in accordance with one potential embodiment of the present disclosure.

A method is provided in one example embodiment and may include configuring a Home Node B (HNB) with a plurality of Radio Network Controller (RNC) identifiers (IDs), wherein each global RNC ID is associated with one of a plurality of HNB gateways (HNB-GWs); broadcasting a first Universal Mobile Telecommunications Systems (UMTS) Terrestrial radio access network (UTRAN) cell ID (UC-ID) by the HNB when the HNB is served by a first HNB-GW; and switching the broadcasting from the first UC-ID to a second UC-ID and re-parenting the HNB to a second HNB-GW, when the HNB loses connectivity with the first HNB-GW. For the method, a HNB cell ID of the HNB when the HNB is served by the first HNB-GW is unchanged when the HNB is served by the second HNB-GW. In some cases, the method can further include identifying, when the HNB loses connectivity with the first HNB-GW and prior to the re-parenting, the second HNB-GW from the plurality of HNB gateways based on a weight factor assigned to the second HNB-GW.

The method can further include configuring the HNB with a plurality of HNB-GW Internet Protocol (IP) addresses, wherein each IP address is associated with one of the plurality of HNB-GWs; and configuring the HNB with a plurality of Security Gateway (SeGW) IP addresses, wherein each SeGW IP address is associated with one of a plurality of SeGWs and wherein each of the plurality of HNB-GWs are associated to each of the plurality of SeGWs to form redundant gateway pairs that can serve the HNB. Configuring the HNB with the plurality RNC IDs, configuring the HNB with the plurality of HNB-GW IP addresses and configuring the HNB the plurality of SeGW IP addresses can be performed by a Radio Access Network (RAN) Management System (RMS). Configuring the HNB with the plurality of RNC IDs further can include one of: configuring the HNB with a plurality of UC-IDs; and configuring the HNB with the plurality of RNC IDs and a HNB Cell ID corresponding to an identity of the HNB.

In some instances, the method can further include communicating the second UC-ID to a Self-Organizing Network (SON) server upon the HNB switching its broadcasting; and updating neighbor information for one or more macro cell radios that neighbor the HNB based on the second UC-ID. In one case, can be performed only if the HNB is designated as an entry point to a building.

As will be appreciated by one of ordinary skill in the art, aspects of the present disclosure, in particular the functionality related to providing HNB gateway redundancy as described herein, may be embodied as a system, a method or a computer program product. Accordingly, aspects of the present disclosure may take the form of an entirely hardware embodiment, an entirely software embodiment (e.g., including firmware, resident software, micro-code, etc.) or an embodiment combining software and hardware aspects that may generally be referred to herein as a circuit, module, logic or system. Operations described in this disclosure may be implemented as an algorithm executed by a processor (e.g., a microprocessor, a hardware processor, etc.) of a computer, server, compute node or the like. Furthermore, aspects of the present disclosure may take the form of a computer program product embodied in one or more computer readable media encoding logic, preferably non-transitory, having computer readable program code and/or instructions embodied, e.g., stored, thereon. In various embodiments, such a computer program may, for example, be downloaded to devices and systems or may be stored upon manufacturing of these devices and systems.

Example Embodiments

Referring to FIG. 1, FIG. 1 a simplified block diagram illustrating a communication system 100 to facilitate providing HNB gateway (HNB-GW) redundancy in a network environment according to one potential embodiment of the present disclosure. The exemplary configuration shown in FIG. 1 may be tied to 3rd Generation Partnership Project (3GPP) 2G and 3G architectures for General Packet Radio Service (GPRS) Packet Switched (PS) and Circuit Switched (CS) services. Alternatively, the depicted architecture may be applicable to other environments equally. Thus, in some instances, communication system 100 may include access networks such as Global System for Mobile Communications (GSM) Enhanced Data Rates for GSM Evolution (EDGE) radio access network (GERAN), generally considered as 2G or pre-3G, Universal Mobile Telecommunications Systems (UMTS) Terrestrial radio access network (UTRAN), generally referred to as 3G. In yet other instances, communication system 100 may include non-3GPP access networks, such as, for example Wi-Fi.

The example architecture of communication system 100 shown in FIG. 1 may include users operating user equipment (UE) 102a-102b; Home Node B (HNB) radio access points 110, 112; security gateways (SeGWs) 114, 116; HNB gateways (HNB-GWs) 118, 120; a RAN Management System (RMS) 122; a NodeB (NodeB) 140; a Radio Network Controller (RNC) 142, a service network 130 and a 3G Core Network (CN) 150, which can include a SON server 152, a Serving GPRS Support Node (SGSN) 154 and a Mobile Switching Center (MSC) 156. HNB radio access point 110 further includes failover logic 124a and a failover database 126a and HNB radio access point 112 further includes a failover logic 124b and a failover database 126b.

As referred to herein in this Specification, a 'HNB radio access point' may be referred to interchangeably as a 'HNB access point', a 'HNB', a 'small cell radio access point', a 'small cell access point', a 'small cell', a 'femtocell' or a 'femto'. As referred to herein in this Specification, a 'NodeB' may be referred to interchangeably as a 'macro cell radio', a 'macro cell' or a 'macro'.

HNBs 110, 112 may have a logical connection with SeGWs 114, 116, HNB-GWs 118, 120 and RMS 122 via service network 130. SeGWs 114, 116 may each have a logical connection with RMS 122. HNB-GWs 118, 120 may each have a logical connection with RMS 122 and with SGSN 154 and MSC 156 of 3G Core Network 150. NodeB 140 may have a logical connection with RNC 142, which may further be interconnected with SGSN 154 and MSC 156. In one embodiment, HNBs 110, 112; SeGWs 114, 116 and HNB-GWs 118, 120 may be configured according to Technical Report 069 (TR-069) protocol using the TR-196 version 2 (TR-196v2) data model through an Auto Configuration Service (ACS) provided via RMS 122. It should be understood that any number of HNBs, SeGws, HNB-GWs, NodeBs and/or RNCs may be deployed in communication system 10. In various embodiments, SON server 152 can have a logical connection with SeGWs 114, 116, HNB-GWs 118, 120, RNC 142, SGSN 154 and/or MSC 156.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communications in a network environment are referred to herein as 'messages', 'messaging' or 'signaling', which may be inclusive of packets. A packet is a formatted unit of data and can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the Open Systems Interconnection (OSI) Model, or any derivations or variants thereof.

The terms 'data' and 'information' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messages. Other protocols, interfaces and/or communication standards that can be used in communication system 100 can include 3GPP DIAMETER-based protocols, Remote Authentication Dial-In User Service (RADIUS) protocols, a service gateway interface (SGi), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), Generic Route Encapsulation (GRE), etc.

In various embodiments, each of service network 130 and 3G Core Network 150 can represent a series of points or nodes of interconnected communication paths (wired or wireless) for receiving and transmitting packets of information that propagate through communication system 100 via HNBs 110, 112 and/or NodeB 140/RNC 142. In various embodiments, service network 130 and/or 3G Core Network 150 can be associated with and/or provided by a single network operator or service provider and/or multiple network operators or service providers. In various embodiments, service network 130 and/or 3G Core Network 150 can include and/or overlap with, in whole or in part, one or more packet data networks, such as, for example, the Internet.

Service network 130 and/or 3G Core Network 150 may offer communicative interfaces between various elements of communication system 100 and may be any local area network (LAN), wireless local area network (WLAN), metropolitan area network (MAN), wide area network (WAN), virtual private network (VPN), enterprise network, Intranet, extranet, or any other appropriate architecture or system that facilitates communications in a network environment. In various embodiments, service network 130 and/or 3G Core Network 150 may implement user datagram UDP/IP connections and/or TCP/IP communication language protocol in particular embodiments of the present disclosure. However, service network 130 and/or 3G Core Network 150 may alternatively implement any other suitable communication protocol, interface and/or standard for transmitting and receiving data packets within communication system 100. In some embodiments, service network 130 and/or 3G Core Network 150 can be multiple networks interconnected via one or more network appliances, elements, gateways, etc. In some embodiments, portions of 3G Core Network 150 and service network 130 may overlap, in whole or in part.

During operation, each HNB 110, 112 can be configured to register (e.g., parent) to a corresponding primary SeGW (e.g., SeGW 114, 116) and a corresponding primary HNB-GW (e.g., HNB-GW 118, 120) upon initialization or re-initialization. RMS 122 may configure each HNB 110, 112 with registration information, which can be used to indicate the primary SeGW and primary HNB-GW to which each HNB should register with upon initialization or re-initialization. In some cases, RMS 122 can be referred to as a Provisioning Management Gateway (PMG). In some embodiments, RMS 122 can be configured with one or more Application Programming Interface(s) (API(s)) which can facilitate communications with an OSS, SON server 152 and/or any other element or node configured for communication system 100.

During registration, a given HNB can perform an Internet Protocol Security (IPSec) communication link set-up with a given SeGW, depending on a configuration provided via RMS 122; in order to protect communications between a given UE, the HNB, SGSN 154 and MSC 156. Generally, IPSec can use cryptographic security services to protect communications over Internet Protocol (IP) networks. IPSec can support network-level peer authentication, data origin authentication, data integrity, data confidentiality (encryption), and replay protection. Implementation of IPSec can be based on Internet Engineering Task Force (IETF) standards.

Generally, at initialization or re-initialization, a given HNB attempts to register with a small cell network by first attempting to establish a secure connection with an SeGW through obtaining an assigned IPSec address (or, more generally, an IP address) for the SeGW from an IP assignment server (not shown), which could be a separate dynamic host configuration protocol (DHCP) server, a Domain Name System (DNS), a local service, another IP assignment entity, etc. Once a secure connection is established with the SeGW, the HNB can attempt to register with RMS 122 by obtaining an assigned IP address for the RMS from an IP assignment server. The RMS 122 can configure the HNB according to TR-069 using the TR-196v2 data model. Once configured, by the RMS, the HNB can then attempt to register with an HNB-GW by obtaining an assigned IP address for the RMS from an IP assignment server. Once registered with the HNB-GW, if a connection is lost with the HNB-GW, then the HNB can attempt to register with another SeGW and HNB-GW, depending on configuration as discussed for various embodiments described herein.

During operation in various embodiments, HNB-GWs 118, 120 and SeGWs 114, 116 can handle both control and data plane traffic for UE 102a-102b. Although illustrated as separate elements in FIG. 1, SeGW 114 and HNB-GW 118 and/or SeGW 116 and HNB-GW 120 can be configured as sharing common or separate hardware implementations in accordance with various embodiments described herein. Thus, a SeGW can, in some embodiments, be considered a logical partition of a HNB-GW that can provide IPSec services for communications exchanged between the HNB-GW, one or more HNBs registered with the HNB-GW and one or more nodes of the 3G Core Network.

In various embodiments, IP addresses as discussed herein can include IP version 4 (IPv4) or IP version 6 (IPv6) IP addresses, depending on deployment configuration. In some embodiments, communications system 100 can support IP tunneling configurations such as, for example, IP in IP encapsulation in which one IP packet is encapsulated in another IP packet. The encapsulated IP packet can include an outer IP address header and an inner IP address header. In one embodiment of communication system 100, IP packets exchanged between a given HNB and HNB-GW can include an outer IP address corresponding to the IPSec address of the SeGW to which the HNB is parented and an inner IP address corresponding to the HNB-GW to which the HNB is parented.

In various embodiments, UE 102a-102b can be associated with users, employees, clients, customers, etc. wishing to initiate a flow in communication system 100 via some network. The terms 'user equipment,' 'mobile node,' 'end user,' 'user,' and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, a wearable electronic device, an electronic device such as a parking meter, vending machine, appliance, etc. or any other device, component, element, or object capable of initiating voice, audio, video, media, or data exchanges within communication system 100. UE 102a-102b may also be inclusive of a suitable interface to a human user such as a microphone, a display, a keyboard, or other terminal equipment.

UE 102a-102b may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In certain embodiments, UE 102a-102b may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

HNBs 110, 112 can offer suitable connectivity to one or more UE 102a-102b using any appropriate protocol or technique. In general terms, HNBs 110, 112 represents a radio access point device that can allow UEs to connect to a network using Wi-Fi, Bluetooth™, WiMAX, 2G, 3G or any other appropriate standard. Hence, the broad term 'radio access point' can be inclusive of a wireless access point (WAP), a femtocell, a hotspot, a picocell, a Wi-Fi array, a wireless bridge (e.g., between networks sharing same Service Set Identifier (SSID) and radio channel), a wireless local area network (WLAN), an HNB, or any other suitable access device that may be capable of providing suitable connectivity to a given UE 102a-102b. In certain cases, the HNBs 110, 112 can connect to a router (e.g., via a wired network), which can relay data between UE 102a, UE 102b and other UEs of the network.

Collectively, HNBs 110, 112, SeGWs 114, 116, HNB-GWs 118, 120 and RMS 122 can be referred to as a 'small cell network', a 'small cell layer' or variations thereof. Collectively, NodeB 140, RNC 142 can be referred to as a 'macro cell network', a 'macro network', a 'macro layer' or variations thereof.

In various embodiments, communication system 100 may include other network elements, gateways, etc. to provide cellular mobile coverage for UE within the system, including, but not limited a Home Subscriber Server/Home Location Register (HSS/HLR), one or more Policy and Charging Rules Functions (PCRFs), and/or one or more Authentication, Authorization and Accounting (AAA) servers or services. These elements are not shown in order to highlight other features of communication system 100. Generally, authentication refers to the process where an entity's identity is authenticated, typically by providing evidence that it holds a specific digital identity such as an identifier and one or more corresponding credentials. Authorization generally refers to determining whether a particular entity is authorized to perform a given activity, typically inherited from authentication when logging-on to or registering with an application, service or element. Accounting generally refers to the tracking of network resource consumption by users for the purpose of capacity and trend analysis, cost allocation, billing, etc.

In general, an MSC for a 3G Core Network (e.g., MSC 156 for 3G Core Network 150) facilitates access to Circuit Switched (CS) services (e.g., voice calls/sessions) provided via the Core Network and an SGSN (e.g., SGSN 154) facilitates access to Packet Switched (PS) services (e.g., data sessions) provided via the Core Network. In some embodiments, 3G Core Network 150 can further include a Gateway GPRS Support Node (GGSN), which can interface with SGSN and a PDN to provide PS services to UE accessing the network via the UTRAN. NodeB 140 and RNC 142 can interface with the 3G Core Network 150 to provide macro UTRAN coverage for communication system 100. Generally, an RNC (e.g., RNC 142) is responsible for controlling and providing Radio Resource Management (RRM) for NodeBs connected to it (e.g., NodeB 140). An HNB-GW is typically considered an RNC for one or more HNBs of a small cell network.

In various embodiments, SON server 152 can interface with RMS 122, RNC 142, SGSN 154 and/or MSC 156. Thus, SON server 152 can have visibility of, and/or may interface with one or more parallel networks such as, for example, a macro cell network, a small cell network, a wireless local area network (WLAN), etc. and can be used to provide coordinated control and configuration of various elements or nodes (e.g., macro cell radios, small cell radios, etc.) of a deployment. In one embodiment, SON server 152 can be configured to maintain a system-wide view of communication system 100 in order to manage one or more neighbor list(s) or neighbor relation table(s) (NRT(s)), which can be used to facilitate handovers between various radio access points of communication system 100 (e.g., macro to small cell, small cell to macro, small cell to small cell, etc.). As referred to herein, a 'handover' can generally refer to the process of handing over a UE from one cell radio to another cell radio. A handover from a macro cell radio to a small cell radio is typically referred to as a 'hand-in' and a handover from a small cell radio to a macro cell radio is typically referred to as a 'hand-out'.

Accordingly, SON server 152 can be configured to interface with any element or node of communication system 100 via one or more logical interfaces. In at least one embodiment, SON server 152 can be deployed within 3G Core Network 150 or within a cloud-based service or architecture (e.g., in a centralized SON (cSON) or distributed SON (dSON) architecture). In various embodiments, SON server 152 can be a specialized unit or part of a virtualized compute platform that can operate in a data center or cloud server center or any other network element that may be associated with a radio access network (RAN). Thus, operational functionality for SON server 152 may be implemented in a virtualized RAN (vRAN) architecture to facilitate dynamic operations for various elements or nodes of communication system 100.

Before detailing some of the operational aspects of FIG. 1, it is important to understand common characteristics of HNBs and HNB-GWs as they generally operate in commercial architectures. The following foundation is offered earnestly for teaching purposes only and, therefore should not be construed in any way to limit the broad teachings of the present disclosure. In many communication network architectures, HNBs can be deployed as autonomous units to improve reception in areas with poor coverage or within buildings where coverage is reduced by the structure itself. In some cases, HNBs can be deployed in areas that are densely populated or have a high concentration of subscribers (e.g., a sports arena, concert venue, etc.) in order to facilitate offloading users from overloaded and/or congested macro networks.

Essentially, HNBs are fully featured base stations that can provide proximate coverage. Typically, HNBs operate at lower radio power levels as compared to macro cell radios (e.g., NodeBs). HNBs can be connected using a standard broadband digital subscriber line (DSL), internet, service network (e.g., service network 130) and/or cable service into a service provider's core network (e.g., 3G Core Network 150). Calls can be made and received, where the signals are sent (potentially encrypted) from the HNB via the broadband IP network to one of the service provider's main switching centers (e.g., MSC 156). Thus, HNBs generally operate as a mini tower for a proximate user. As used herein in this Specification, the terms 'user', 'UE' and 'subscriber' can be used interchangeably.

In order to scale deployments of HNBs, small cell architectures beneficially includes HNB-GWs. An HNB-GW enables all HNBs parented to the gateway to be represented as a single NodeB to the 3G Core Network. In effect, an HNB-GW presents an aggregate of all of the HNBs connected to it to the 3G Core Network.

When a group (or all) of HNBs for a deployment can only be parented to a single HNB-GW, failure of this gateway or loss of connectivity of a particular HNB to the particular gateway may have dire consequences because UE traffic traversing the HNB-GW can be dropped. Therefore, HNB-GW redundancy is increasingly being demanded by network service providers to provide robust small cell network coverage, to provide high availability of HNB-GWs and SeGWs, to provide automated disaster recovery across site outages, power failures or other disasters and/or to provide extended gateway maintenance windows (e.g., extended times for servicing gateways). Under an HNB-GW redundancy scheme, HNBs can be re-parented to a backup SeGW and HNB-GW in the event of a failure or loss of connection to a primary SeGW and HNB-GW.

One current solution that attempts to facilitate HNB-GW redundancy involves deploying redundant pairs of HNB-GWs at geographically distinct sites. In the event of a loss of connectivity or failure between a given HNB and a given primary SeGW and HNB-GW at a first geographic site, the HNB can attempt to re-parent to a secondary SeGW and HNB-GW located at a second geographic site. While this solution provides for basic HNB-GW redundancy, it is limited by multiple drawbacks. Among them, some of the more prominent drawbacks include: hand-in from a NodeB to a HNB that has re-parented to a secondary SeGW and HNB-GW is unavailable while the HNB operated under the secondary SeGW and HNB-GW; handover between HNBs via the 3G Core Network can be degraded or unavailable altogether during a primary site outage; and/or HNBs need to reconnect back to their primary SeGW and HNB-GW immediately after primary site restoration to enable the aforementioned mobility events, which can lead to increased signaling load between the primary site and the Core Network immediately upon site restoration.

In accordance with one embodiment, communication system 100 can overcome the aforementioned shortcomings (and others) by providing a system and method to facilitate HNB-GW redundancy that enables macro to HNB hand-ins as well as HNB to HNB handovers via the 3G Core Network 150 during periods in which HNBs are parented to a secondary or backup SeGW and HNB-GW.

During operation, in accordance with at least one embodiment, RMS 122 can provide each respective HNB 110, 112 with a respective primary SeGW IP address and primary HNB-GW IP address for a respective primary SeGW/HNB-GW deployed at a first geographic site and a respective secondary SeGW IP address and secondary HNB-GW IP address for a respective secondary SeGW/HNB-GW deployed at a second geographic site such that the first and the second site are geographically distinct. As referred to herein in this Specification, the terms 'primary' and 'default' can be used interchangeable and the terms 'secondary' and 'backup' can be used interchangeably.

For example, HNB 110 can be provided with primary IP addresses corresponding to SeGW 114 and HNB-GW 118 as a primary gateway set to facilitate connectivity with 3G Core Network 150 (e.g., with SGSN 154 and MSC 156). HNB 110 can also be provided with secondary IP addresses corresponding to SeGW 116 and HNB-GW 120 as a secondary gateway set to which HNB 110 can re-parent in the event of a loss of connectivity to SeGW 114 and HNB-GW 118. HNB 110 can be provided with the primary and secondary IP address information for the redundant gateway pairs by RMS 122 at initialization or re-initialization of HNB 110. The IP address information can be stored in failover database 126a.

HNB 112 can be provided with similar sets of IP address information for a primary and a secondary set of gateways to which HNB 112 can parent/re-parent. For example, SeGW 116 and HNB-GW 120 could be a primary set of gateways for HNB 112 with SeGW 114 and HNB-GW 118 being secondary gateways. HNB 112 can be provided with the primary and secondary IP address information for the redundant gateway pairs by RMS 122 at initialization or re-initialization of HNB 112. The IP address information can be stored in failover database 126b.

In one embodiment, SeGW 114/HNB-GW 118 and SeGW 116/HNB-GW 120 can be configured as a 'gateway group instance' in RMS 122 that can be associated with one or more RNC identifier(s) (RNC ID(s)). The term 'gateway group instance', as referred to herein, can be used to describe a set of primary and secondary SeGW/HNB-GW redundant gateway pairs associated with one or more RNC ID(s) for a set of one or more HNBs.

In addition to providing primary and secondary gateway IP address information to HNBs 110, 112, RMS 122 also provides each respective HNB 110, 112 with a respective primary and secondary RNC ID corresponding to each respective HNBs respective primary and secondary HNB-GW. During operation, a given HNB broadcasts over-the-air (OTA) transmissions that include a UTRAN Cell Identity (UC-ID) for the HNB. A UC-ID is a 28-bit value in which the upper 12-bits correspond to an RNC ID and the lower 16-bits corresponds to an HNB Cell ID (C-ID) of the HNB. An example 28-bit UC-ID 180 is illustrated in FIG. 1 having a 12-bit (3 nibbles) upper RNC ID portion 182 and a lower 16-bit (4 nibbles) HNB Cell ID portion 184. In various embodiments, a respective HNB Cell ID (C-ID) for each respective HNB 110, 112 can be configured by RMS 122 at initialization or re-initialization of each respective HNB 110, 112.

RMS 122 can provide primary and secondary RNC IDs to each HNB 110, 112 using various techniques. In one embodiment, RMS 122 can provide a respective primary and secondary RNC ID to each respective HNB 110, 112 separate from a respective HNB Cell ID provided to each respective HNB. A given HNB say, for example, HNB 110 can combine a primary and secondary RNC ID with its corresponding HNB Cell ID, as provided by RMS 122, in order to derive a primary and secondary UC-ID that HNB 110 can broadcast based on whether it is connected to its primary HNB-GW or its secondary HNB-GW. In another embodiment, RMS 122 can provide a respective primary and secondary UC-ID to each respective HNB 110, 112. A given HNB say, for example, HNB 112 can determine its HNB Cell ID by parsing the lower 16 bits of either the primary or the secondary UC-ID provided to the HNB. In various embodiments, ID information for HNB 110 can be stored in failover database 126a and ID information for HNB 112 can be stored in failover database 126b.

Consider an operational example in which HNB 110 has been configured to with IP address information identifying SeGW 114 and HNB-GW 118 as a set primary gateways SeGW 116 and HNB-GW 120 as a set of secondary gateways. Assume for the operational example that HNB 110 has also been configured with a primary RNC ID for primary HNB-GW-118 and a secondary RNC ID for HNB-GW 120 and has also been configured with an HNB Cell ID for HNB 110 using any of the techniques described herein. Assume a connection failure occurs with a corresponding primary SeGW 114 and HNB-GW 118. Upon detecting the connection failure, HNB 110, via its respective failover logic 124a and failover database 126a, can attempt to re-parent to its configured secondary SeGW 116 and HNB-GW 120 using the IP address information provided by RMS 122 and can, upon successfully re-parenting to the secondary gateways, can switch its OTA broadcasts to its configured secondary UC-ID.

In addition to switching its OTA broadcast, an HNB that has been re-parented to a secondary SeGW and HNB-GW can perform network listen (NWL) or Fast-Sniff operations, as configured by a network operator, to identify any new neighboring cell radios (e.g., neighboring HNBs and/or macro cell radios). Generally, NWL operations involve measuring signal strength information for OTA broadcasts transmitted by neighboring cell radios (e.g., downlink transmissions), typically performed across multiple frequencies and radio frames. Fast-Sniff operations are similar to NWL operations, yet typically involve a single frame scan of a radio environment to measure signal strength information of any neighboring cell radios.

Upon completion of an HNB re-parenting to a secondary SeGW and HNB-GW, RMS 122 can update neighbor information for any neighboring HNBs (e.g., HNB 112) and any neighboring NodeBs (e.g., NodeB 140) with the secondary UC-ID being broadcast OTA by the HNB in order to facilitate small cell to small cell handovers and macro to small cell. RMS 122 can become aware of an HNB switching its OTA broadcasts using a variety of techniques.

Consider the present operational example involving HNB 110. In on embodiment, RMS 122 can be made aware of HNB 110 re-parenting to its secondary HNB-GW 120 via legacy AAA authentication/authorization request (Auth-Req) messaging sent from the secondary HNB-GW 120 to the RMS 122 during the re-parenting process. Upon confirming HNB 110 has the appropriate credentials and IP addresses for the secondary SeGW 116 and HNB-GW 120, RMS 122 can update UC-ID information stored for HNB 110 to the secondary UC-ID configured for HNB 110. In another embodiment, HNB 110 can inform RMS 122 when it switches its broadcasting to the secondary UC-ID via a TR-069 configuration update exchange with RMS 122.

In one embodiment, upon becoming aware of a change to a secondary UC-ID for a given HNB (e.g., HNB 110), RMS 122 can task each other neighboring HNB (e.g., HNB 112) for a deployment to perform a new network listen/Fast-Sniff or to replace any occurrence of the primary RNC ID with the secondary RNC ID to update their neighbor list information to ensure small cell to small cell handovers can be performed following a re-parenting. In another embodiment, RMS 122 can provide a corresponding secondary RNC ID for the HNB that has re-parented to a secondary HNB-GW to each of the neighboring HNBs so that the neighboring HNBs can update their neighbor list information with the new RNC ID.

RMS 122 can also inform SON server 152 regarding a change in UC-ID for a given HNB. SON server 152 can update a Primary Scrambling Code (PSC) association for the HNB, which was previously associated with the primary UC-ID for the HNB to the secondary UC-ID for the HNB. In various embodiments, RMS 122 can inform the SON server 152 of the entire secondary UC-ID for the HNB or can inform the SON server of only the secondary RNC-ID portion of the secondary UC-ID. In turn, SON server 152 can update neighbor list information for any macro cell radios neighboring the HNB that switched its OTA broadcast (e.g., NodeB 140/RNC 142 neighboring HNB 110 for the present operational example) to facilitate macro to small cell hand-ins. Thus, a relocation request can be handled appropriately by a secondary HNB-GW forwarding the relocation request to the correct HNB.

In at least one embodiment, the neighbor list for any neighboring macro/RNC may be updated only if an HNB that switches its broadcast is an Active Mode AP. As referred to herein, an Active Mode AP can be an HNB for a group of HNBs that is located at an entry of a building or structure that is designated as a mobility entry point for the group of HNBs or can be a subset of high-value stand-alone enterprise APs for an enterprise deployment. In some small cell deployments, hand-in from a neighboring macro cell radio or hand-out to a neighboring macro cell radio can be enabled only for an Active Mode AP of an HNB group. Once hand-in to an Active Mode HNB occurs for a given deployment, the Active Mode HNB can provide handover to other HNBs in the deployment and the other non-Active Mode HNBs in the deployment can provide handover to other non-Active Mode HNBs or back to the Active Mode HNB for UE within the building or structure.

Accordingly, the system and method provided by communication system 100 can provide several advantages over current solutions for providing HNB-GW redundancy. Foremost, the system and method provided by communication system 100 provides that messages routed via RMS 122 can now be correctly routed to a backup or secondary HNB-GW for an HNB having re-parented to the secondary rather than to its primary HNB-GW. In various embodiments, communication system 100 can provide for routing legacy AAA Auth-Req messaging as well as HNB shutdown requests and whitelist updates received from an Operational Support System (OSS) when an HNB is being served by a secondary HNB-GW. Communication system 100 also provides for the application of unique UC-IDs that can be used across a plurality of HNB-GWs for a deployment. In some embodiments, the system and method provided by communication system 100 can help to avoid expensive Inter-Chassis Session Recovery (ICSR) setup for small cells as they are often considered coverage fillers.

Thus, communication system 100 can enable macro to small cell hand-ins when an HNB is being served by a secondary HNB-GW. Communication system 100 can also enable small cell to small cell handovers via the Core Network (e.g., Radio Access Bearer(s) (RAB(s)) for a UE are updated with the CN) when an HNB is being served by a secondary HNB-GW. Further for communication system 100, there is no requirement for HNBs to reconnect back to their primary HNB-GW upon primary site restoration, which can prevent flooding the network and/or disrupting existing services. In some embodiments, the system and method provided by communication system 100 can also improve load-balancing for a deployment and, in some cases, can be used as an automatic load-balancing function by RMS 122, as discussed in further detail herein.

Figure 2A:
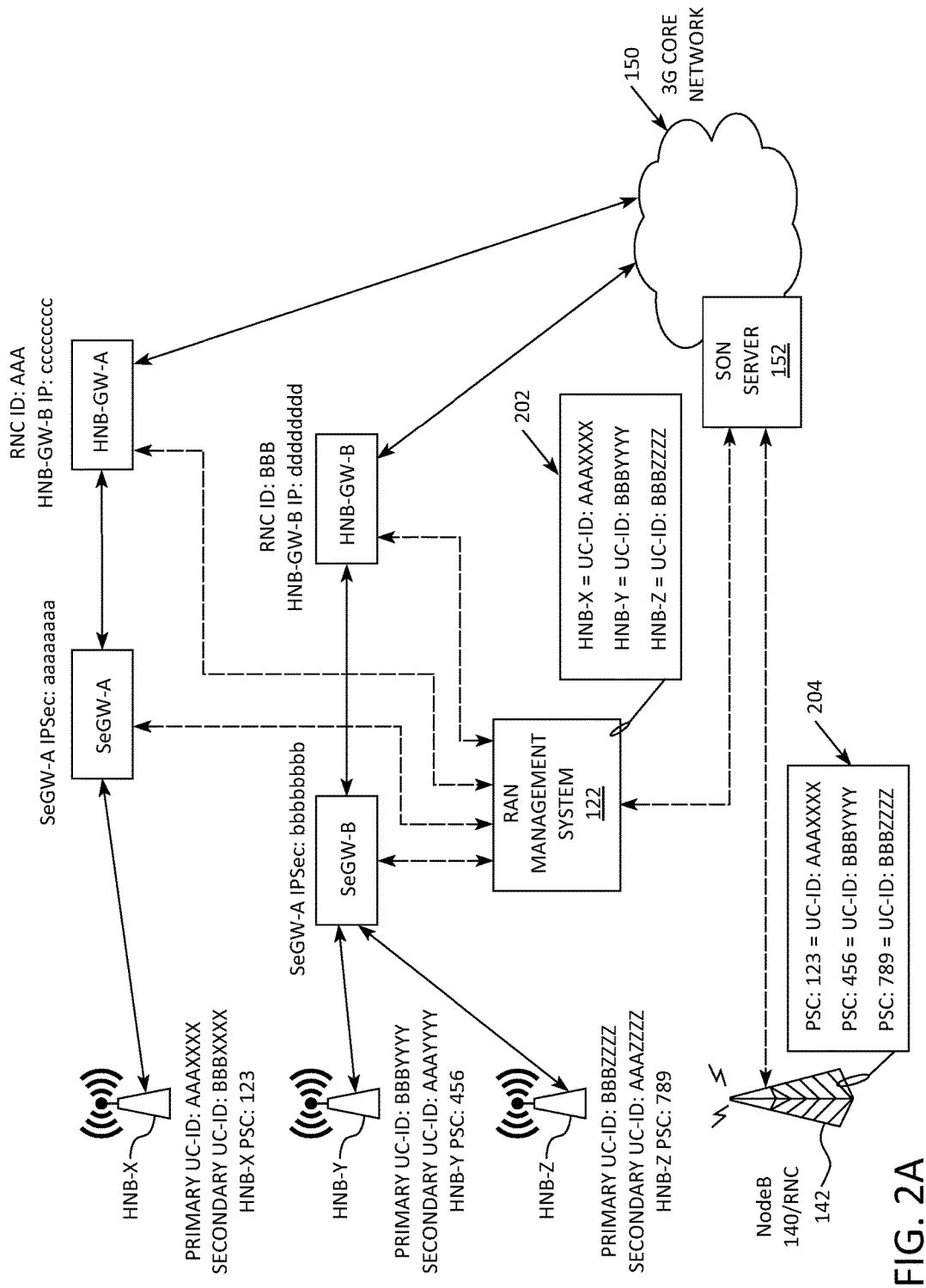
FIGS. 2A-2B are simplified block diagrams illustrating example details associated with providing HNB-GW redundancy for an example failover user case in accordance with one potential embodiment of the communication system.
Figure 2B:
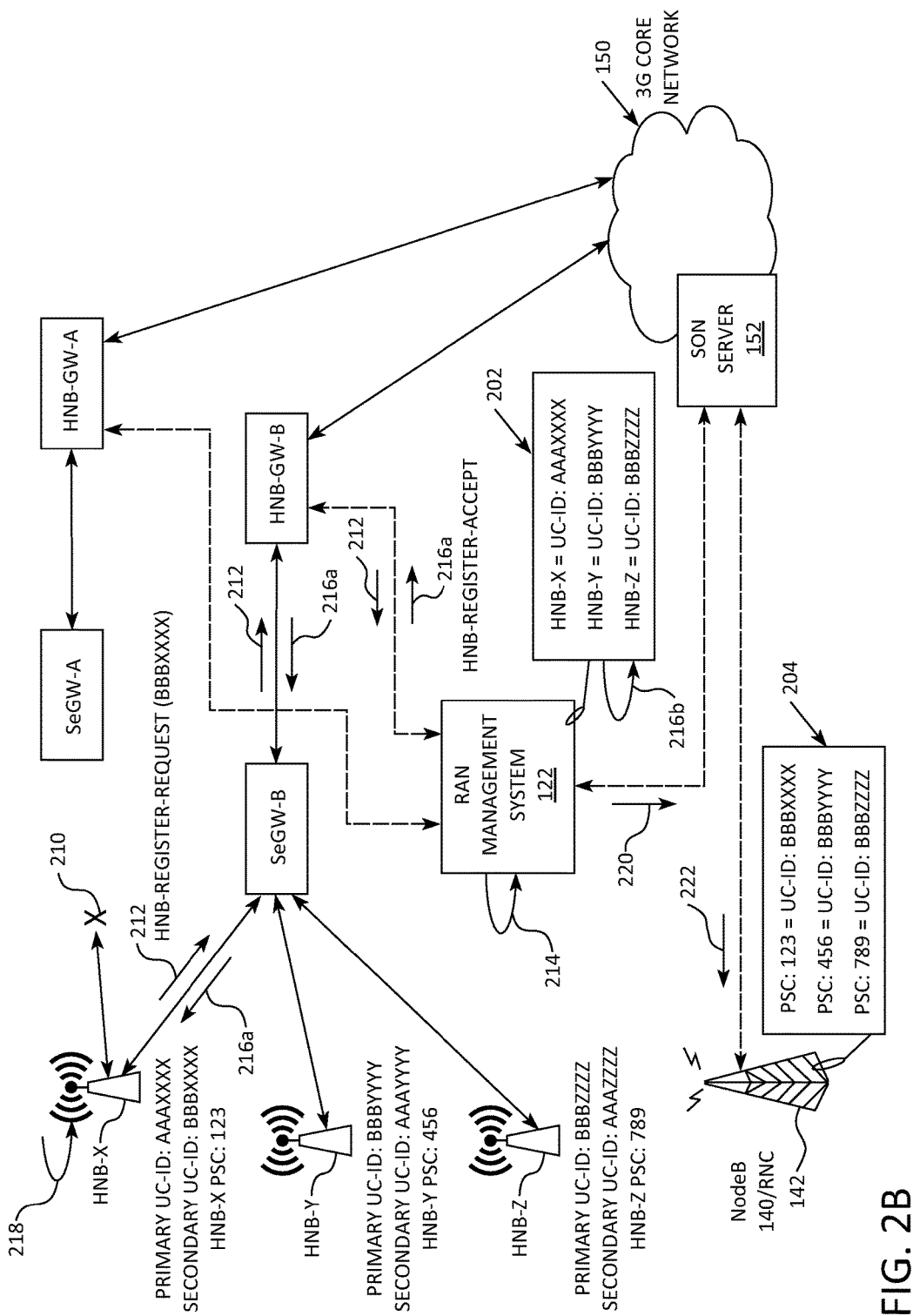

Consider another operational example, as shown in FIGS. 2A-2B. FIGS. 2A-2B are simplified block diagrams illustrating an example failover use case in accordance with one potential embodiment of communication system 100. FIGS. 2A-2B includes three HNBs, HNB-X, HNB-Y and HNB-Z; a first SeGW, SeGW-A, and a first HNB-GW, HNB-GW-A; a second SeGW, SeGW-B, and a second HNB-GW, HNB-GW-B. HNB-1, HNB-2 and HNB-3 can include functionality the same as HNBs 110, 112 as discussed in FIG. 1, SeGW-A and SeGW-B can include functionality the same as SeGWs 114, 116 as discussed in FIG. 1 and HNB-GWs 118, 120 can include functionality the same as HNB-GWs 118, 120 as discussed in FIG. 1. FIGS. 2A-2B also include RMS 122, SON server 152, NodeB 140/RNC 142 and 3G Core Network 150. SGSN 154 and MSC 156 are not shown in FIGS. 2A-2B in order to illustrate other features of the communication system for purposes of brevity, however, any of these can be referenced herein in discussing certain features of the communication system.

Referring to FIG. 2A, each HNB, HNB-X, HNB-Y and HNB-Z is configured via RMS 122 (e.g., at initialization or re-initialization) with: 1) an IP address for a primary SeGW and an IP address for a primary HNB-GW; 2) an IP address for a secondary SeGW and an IP address of a secondary HNB-GW; and 4) either of (a) an HNB Cell ID (C-ID) and a first and secondary RNC ID for its corresponding primary and secondary HNB-GW or (b) a primary UTRAN Cell ID (UC-ID) and a secondary UC-ID. If each HNB is provided a primary and a secondary UC-ID, the HNB can derive its HNB Cell ID from the lower 16-bits (4 nibbles) of either the primary or the secondary ID.

For FIGS. 2A-2B, HNB-GW-A is assumed to be configured with an example RNC ID: 'AAA' and HNB-GW-B is assumed to be configured with an example RNC ID: 'BBB'. SeGW-A is assumed to be configured with an IPSec address 'aaaaaaaa'; SeGW-B is assumed to be configured with an IPSec address 'bbbbbbbb'; HNB-GW-A is assumed to be configured with an IP address 'cccccccc'; and HNB-GW-B is assumed to be configured with an IP address 'dddddddd'. In one embodiment, the IP addresses can be stored within a memory element and/or storage for RMS 122.

Further for FIGS. 2A-2B, SeGW-A and HNB-GW-A are assumed to be configured as a primary SeGW/HNB-GW for HNB-X and SeGW-B and HNB-GW-B are assumed to be configured as a secondary SeGW/HNB-GW for HNB-X; SeGW-B and HNB-GW-B are assumed to be configured as a primary SeGW/HNB-GW for HNB-Y and SeGW-A and HNB-GW-A are assumed to be configured as a secondary SeGW/HNB-GW for HNB-Y; and SeGW-B and HNB-GW-B are assumed to be configured as a primary SeGW/HNB-GW for HNB-Z and SeGW-A and HNB-GW-A are assumed to be configured as a secondary SeGW/HNB-GW for HNB-Z.

Thus, HNB-X can be configured to broadcast a primary UC-ID: AAAXXXX when parented to primary SeGW-A/HNB-GW-A and to broadcast a secondary UC-ID: BBBXXXX when parented to secondary SeGW-B/HNB-GW-B such that "XXXX" is assumed to be the HNB Cell ID (C-ID) for HNB-X; HNB-Y can be configured to broadcast a primary UC-ID: BBBYYYY when parented to primary SeGW-B/HNB-GW-B and to broadcast a secondary UC-ID: AAAYYYY when parented to secondary SeGW-A/HNB-GW-A in which "YYYY" is assumed to be the HNB Cell ID (C-ID) for HNB-Y; and HNB-Z can be configured to broadcast a primary UC-ID: BBBZZZZ when parented to primary SeGW-B/HNB-GW-B and to broadcast a secondary UC-ID: AAAZZZZ when parented to secondary SeGW-A/HNB-GW-A in which "ZZZZ" is assumed to be the HNB Cell ID (C-ID) for HNB-Z.

RMS 122 can maintain an HNB UC-ID table 202, which includes entries for the UC-ID being broadcast by HNB-X, HNB-Y and HNB-Z. In an embodiment, RMS 122 can further provision a PSC for each HNB at initialization and can maintain an association of each HNB's UC-ID with its PSC. In another embodiment, SON server 152 can determine a PSC for each HNB at initialization or re-initialization of each HNB in order to manage PSC coordination for a number of HNBs deployed and can communicate the PSC to RMS 122 for provisioning each of the HNBs accordingly. SON server 152 can provide NodeB 140/RNC 142 with the PSC and UC-ID information for each of HNB-X, HNB-Y and HNB-Z in order to provision a Neighbor List 204 for the NodeB/RNC to enable macro to femto hand-ins for the communication system.

Moving to FIG. 2B, it is assumed at 210 that HNB-X detects a loss of connectivity with HNB-GW-A. In various embodiments, the loss of connectivity could be due to a catastrophic failure of HNB-GW-A or other loss of connectivity with the HNB-GW. At 212, HNB-X attempts to connect to secondary SeGW-B and secondary HNB-GW-B (e.g., referred to collectively as secondary SeGW-B/HNB-GW-B). In an embodiment, HNB-X can send HNB-GW-B a HNB-REGISTER-REQUEST message, as prescribed in 3GPP TS 25.467, in which the outer IP address is equal to IPSec address 'bbbbbbbb' for SeGW-B and the inner IP address is equal to IP address 'dddddddd' for HNB-GW-B and the message can be forward to RMS 122. In various embodiments, the HNB-REGISTER-REQUEST message can include the secondary UC-ID BBBXXXX configured for HNB-X, which includes the secondary RNC ID BBB for HNB-GW-B and the HNB Cell ID XXXX for HNB-X and any other credentials associated with HNB-X (e.g., location information, HNB operating parameters, etc.).

At 214, RMS 122 authenticates and/or authorizes the request against the HNB Cell ID and credentials for HNB-X. In an embodiment, this can include matching the secondary UC-ID for HNB-X against the preconfigured secondary RNC ID for HNB-GW-B or secondary UC-ID (depending on configuration) which identifies that HNB-GW-B has been configured as a secondary HNB-GW for HNB-X. Without the secondary RNC ID or secondary UC-ID being preconfigured, RMS 122 would have rejected the request and the Iuh registration of HNB-X would have failed and the HNB would have been locked out of service.

At 216a, it is assumed that HNB-X passes the registration request and RMS 122 sends an HNB-REGISTER-ACCEPT message to HNB-X. At 218, it is assumed that HNB-X switches its OTA broadcast to broadcast secondary UC-ID: BBBXXXX. At 216b, RMS 122 updates HNB UC-ID table 202 to include reflect the secondary UC-ID: BBBXXXX being broadcast by HNB-X. As noted herein, in one embodiment, RMS 122 can infer a switch of the OTA broadcast by HNB-X upon accepting the registration of HNB-X or, in another embodiment, HNB-X can send an update configuration to RMS 122 via TR-069 signaling to indicate that HNB-X has switched its OTA broadcast to the secondary UC-ID.

In an embodiment, HNB-X can perform a network listen or Fast Sniff to re-populate its neighbor list following the switch to the secondary UC-ID. RMS 122 can also task each of HNB-Y and HNB-Z to update their corresponding neighbor lists via a network listen or Fast Sniff or via replacing any occurrence of RNC ID: AAA with RNC ID: BBB in their corresponding neighbor lists.

At 220, RMS 122 informs SON server 152 regarding the change of RNC ID for HNB-X and at 222, SON server 152 updates Neighbor List 204 such that PSC 123 for HNB-X is now associated with UC-ID: BBBXXXX. Following the update of Neighbor List 204, hand-in for a given UE from NodeB 140 to HNB-X can enabled as the NodeB/RNC will know which HNB-GW (e.g., secondary HNB-GW-B for HNB-X) to route any Relocation Request messages associated with PSC 123 and the HNB-GW can forward the request to HNB-X.

Figure 3:
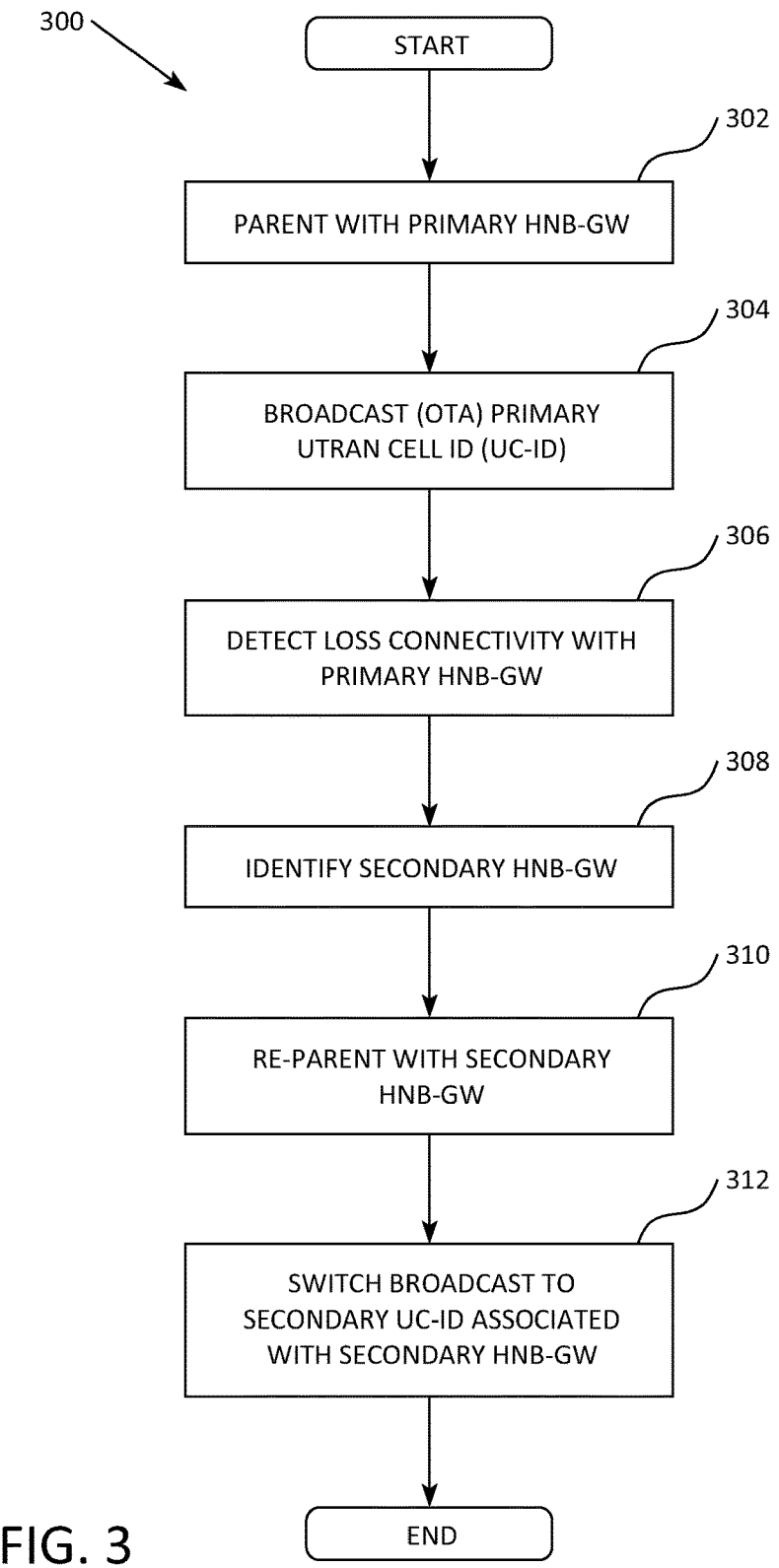
FIG. 3 is a simplified flow diagram illustrating example operations that can be associated with providing HNB-GW redundancy in accordance with one potential embodiment of the communication system.

Referring to FIG. 3, FIG. 3 is a simplified flow diagram 300 illustrating example operations that can be associated with providing HNB-GW redundancy in accordance with one potential embodiment of communication system 100. In various embodiments, the operations can be associated with any HNB (e.g., HNB 110, 112, HNB-X, HNB-Y, HNB-Z) and any set of gateways (e.g., SeGW 114/HNB-GW 118, SeGW 116/HNB-GW 120, SeGW-A/HNB-GW-A, SeGW-B/HNB-GW-B), which may be provided as redundant gateway pairs at geographically distinct sites for one or more HNBs that may be deployed for communication system 100, RMS 122, SON server 152 and any NodeB/RNC (e.g., NodeB 140/RNC 142) that may be deployed for communication system 100.

For purposes of the embodiment shown in FIG. 3, it is assumed that HNB-Y (as shown in FIG. 2A) is configured with a primary UC-ID that includes, at least in part, a primary RNC ID for HNB-GW-B and a secondary UC-ID that includes, at least in part, a secondary RNC ID for HNB-GW-A. Thus, HNB-GW-B can be configured as the primary HNB-GW for HNB-Y and HNB-GW-A can be configured as the secondary HNB-GW for HNB-Y. In various embodiments, one or more additional secondary SeGW/HNB-GW gateway sets can be configured for HNB-Y.

At 302, it is assumed that HNB-Y parents (e.g., registers) with and is served by its primary HNB-GW (e.g., HNB-GW-B). At 304, HNB-Y broadcasts (OTA) its primary UTRAN Cell ID (UC-ID). At 306, HNB-Y detects a loss of connectivity with its primary HNB-GW-B. As long as there is no loss of connectivity with its primary HNB-GW-B, HNB-Y can continue to broadcast its primary UC-ID.

Upon detecting the loss of connectivity with its primary HNB-GW-B, HNB-Y can identify, at 308, a secondary HNB-GW to which HNB-Y can attempt to re-parent. In some embodiments, providing HNB-GW redundancy for communication system 100 can include provisioning each HNB with a priority list (e.g., via each respective HNBs failover database), which can be used to indicate policies, rules and/or an order or rank of secondary HNB-GWs that each HNB can attempt to re-parent with upon detecting a failure with its primary HNB-GW. In one embodiment, for example, a weight factor can be assigned to each of multiple secondary HNB-GWs that can be provisioned for a given HNB. Upon detecting a failure with its primary HNB-GW, the given HNB can identify a particular first secondary HNB-GW to which the HNB can attempt to re-parent. If the re-parenting fails, the HNB can identify a second secondary HNB-GW to which to attempt to re-parent, and so on until the HNB successfully re-parents with a particular secondary HNB-GW.

In some embodiments, weight factors for secondary HNB-GW selection can be provisioned by RMS 122 and/or SON server 152 at initialization or re-initialization of HNBs for a deployment. In still some embodiments, weight factors for secondary HNB-GW selection can be provisioned at initialization or re-initialization and dynamically updated periodically, in response to detected network congestion, based on HNB-GW capabilities, etc. in order to provide load-balancing considerations within communication system 100.

At 310, HNB-Y re-parents with the identified secondary HNB-GW (e.g., HNB-GW-A). At 312, HNB-Y switches its OTA broadcast to begin broadcasting the secondary UC-ID associated with the identified secondary HNB-GW and the operations can end. In addition to the operations performed at HNB-Y, RMS 122 can inform SON server 152 of the updated UC-ID for the HNB and the SON server 152 can cause the Neighbor List for NodeB 140/RNC 142 to be updated with the secondary UC-ID for HNB-Y as discussed for various embodiments described herein.

Accordingly, the system and method provided by communication system 100 can enable both macro to small cell hand-ins as well as small cell to small cell handovers when a given HNB is parented to its backup HNB-GW. Messages can be appropriately routed to an HNB parented to a redundant backup gateway using neighbor information for the HNB.

Figure 4A:
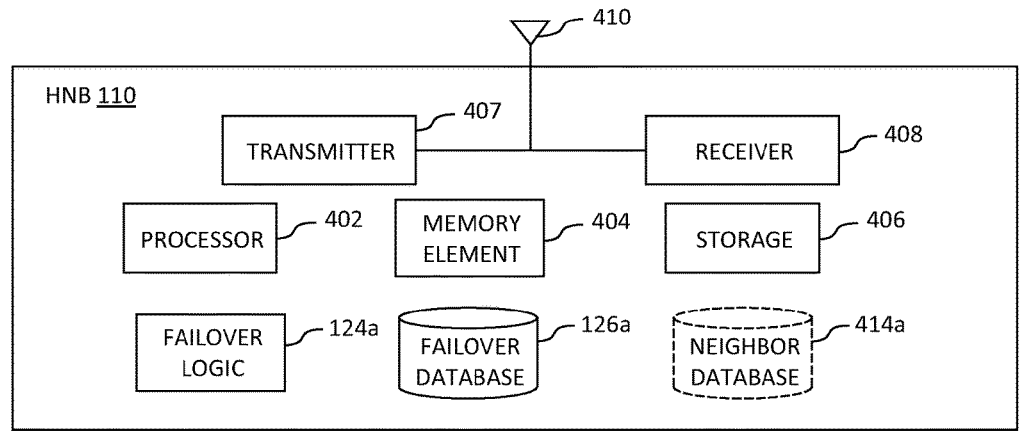
FIGS. 4A-4C are a simplified block diagram illustrating example details that can be associated with the communication system in accordance with various potential embodiments.
Figure 4B:
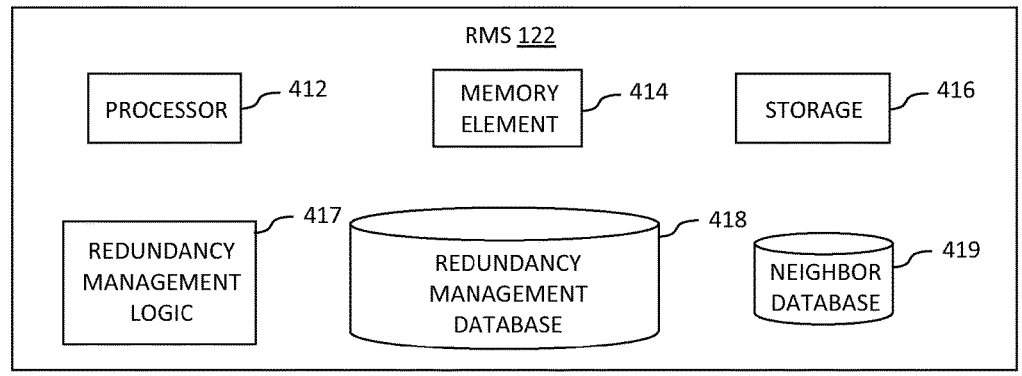
Figure 4C:
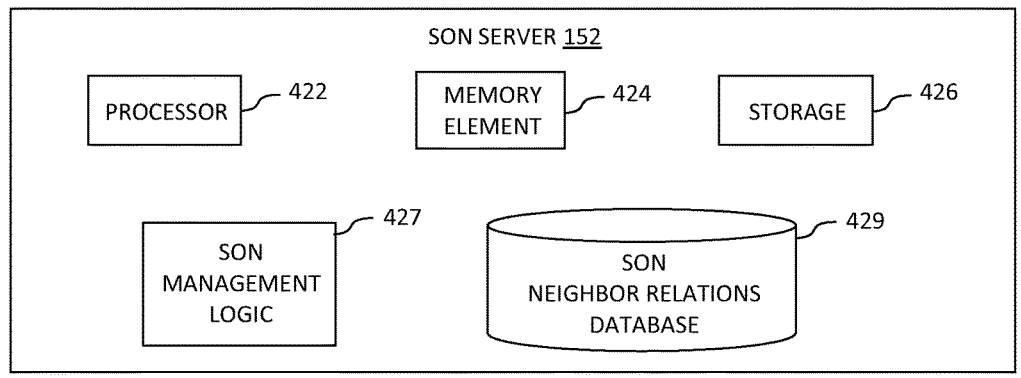

Turning to FIGS. 4A-4C, FIGS. 4A-4C are simplified block diagrams illustrating example details of various elements that can be associated with communication system 100 in accordance with one or more embodiments. FIG. 4A is a simplified block diagram illustrating example details that can be associated with HNB 110 or any other HNB that can be deployed in accordance with at least one embodiment of communication system 100. FIG. 4B is a simplified block diagram illustrating example details that can be associated with RAN Management System (RMS) 122 or any other RMS that can be deployed in accordance with at least one embodiment of communication system 100. FIG. 4C is a simplified block diagram illustrating example details that can be associated with SON server 152 or any other SON server that can be deployed in accordance with at least one embodiment of communication system 100. Although not shown in FIGS. 4A-4C, it should be understood that any, UE, element and/or node as described herein can be configured with various interfaces to facilitate various messaging and operations as described herein.

Referring to FIG. 4A, HNB 110 or any other HNB that can be deployed in accordance with at least one embodiment of communication system 100 (e.g., HNB 112, HNB-X, HNB-Y, HNB-Z, etc.) can include at least one processor 402, at least one memory element 404, a storage 406, at least one transmitter 407, at least one receiver 408, at least one antenna 410, failover logic 124a and failover database 126a.

In one embodiment, HNB 110 can further include a neighbor database 414a. In at least one embodiment, at least one processor 402 is at least one hardware processor configured to execute various tasks, operations and/or functions of HNB 110 as described herein, at least one memory element 404 is configured to store data associated with HNB 110 and storage 406 can be configured to store information associated with various operations as described herein. At least on transmitter 407 and at least one receiver 408 can facilitate transmitting and receiving, respectively, OTA signals via at least one antenna 410.

In various embodiments, failover logic 124a is configured to implement various HNB-GW failover operations as described herein, including, but not limited to: determining a loss of connectivity with a particular HNB-GW, identifying a particular secondary HNB-GW to which to attempt to re-parent (e.g., based on priority, weight factors, etc.), re-parenting with an identified secondary HNB-GW, broadcasting or switching broadcasting of a particular UC-ID, combinations thereof or any other operations as described herein.

In various embodiments, failover database 126a can be configured via RMS 122 with information that can be used during HNB-GW failover operations including, but not limited to: primary and one or more secondary RNC IDs, primary and one or more secondary UC-IDs, an HNB Cell ID for HNB 110, IP addresses for primary and one or more redundant gateway pairs of SeGW/HNB-GW, secondary HNB-GW identification parameters (e.g., priority, weight factors, etc.) combinations thereof or any other information that may be associated with HNB-GW failover operations as described herein.

In some embodiments, neighbor database 414a can be configured with neighbor list information for one or more neighbors identified by HNB 110 using network listen or Fast-Sniff operations or any other neighbor sensing operations that can be performed by HNB 110 and/or that can be provided via RMS 122 and/or SON server 152. In other embodiments, neighbor list information can be stored in storage 406 and/or failover database 126a.

Referring to FIG. 4B, RMS 122 or any other RMS that can be deployed in accordance with at least one embodiment of communication system 100 can include at least one processor 412, at least one memory element 414, a storage 416, a redundancy management logic 417, a redundancy management database 418 and a neighbor database 419. In at least one embodiment, at least one processor 412 is at least one hardware processor configured to execute various tasks, operations and/or functions of RMS 122 as described herein, at least one memory element 414 is configured to store data associated with RMS 122 and storage 416 can be configured to store information associated with various operations as described herein.

In various embodiments, redundancy management logic 417 is configured to implement various HNB-GW redundancy management operations as described herein including, but not limited to: configuring HNBs with a primary and one or more secondary HNB-GW information, which can include RNC IDs or UC-IDs (depending on configuration), IP address information and/or secondary HNB-GW priorities, weight factors, etc.; informing SON server 152 of an updated UC-ID being broadcast by a given HNB; triggering HNBs to update their neighbor relation table(s); communicating updated RNC IDs to neighboring HNBs; maintaining an HNB UC-ID table; combinations thereof or any other operations as described herein.

In various embodiments, redundancy management database 418 can be configured with information that can be used to facilitate HNB-GW failover operations including, but not limited to: primary and one or more secondary RNC IDs, primary and one or more secondary UC-IDs (e.g., for maintaining an HNB UC-ID table), an HNB Cell ID for HNB 110, IP addresses for primary and one or more redundant gateway pairs of SeGW/HNB-GW, secondary HNB-GW identification parameters (e.g., priority, weight factors, etc.) combinations thereof or any other information that may be associated with HNB-GW redundancy operations as described herein that can be facilitated via communication system 100. In various embodiments, neighbor database 419 can be configured with neighbor list information for one or more neighbors identified by HNBs that are managed by RMS 122. In some embodiments, RMS 122 can include PSC information for one or more HNBs managed thereby in any of storage 416, redundancy management database 418 and/or neighbor database 419.

Referring to FIG. 4C, SON server 152 or any other SON server that can be deployed in accordance with at least one embodiment of communication system 100 can include at least one processor 422, at least one memory element 424, a storage 426, a SON management logic 427 and a SON neighbor relations database 429. In at least one embodiment, at least one processor 422 is at least one hardware processor configured to execute various tasks, operations and/or functions of SON server 152 as described herein, at least one memory element 424 is configured to store data associated with SON server 152 and storage 426 can be configured to store information associated with various operations as described herein.

In various embodiments, SON management logic 427 is configured to implement various SON server operations as described herein including, but not limited to: updating neighbor lists for one or more macro NodeB/RNCs in communication system 100; maintaining neighbor relationship tables for one or more macro cell radios and one or more small cell radios in communication system 100; configuring and/or updating PSC information for one or more HNBs; configuring and/or updating secondary HNB-GW priorities, weight factors, etc.; tracking macro and/or small cell loading; combinations thereof or any other operations as described herein.

In various embodiments, SON neighbor relations database 429 can be configured with information including, but not limited to: neighbor relation tables for macro and small cell radios in communication system 100, which can include PSC information for cell radios, UC-IDs, Cell IDs, location information, combinations thereof or any other identifying information that can be associated with cell neighbor relation tables for communication system 100.

In regards to the internal structure associated with communication system 100, additionally each of UE 102a-102b, HNB 112, HNB-X, HNB-Y, HNB-Z, SeGW 114, SeGW 116, SeGW-A, SeGW-B, HNB-GW 118, HNB-GW 120, HNB-GW-A, HNB-GW-B, NodeB 140, RNC 142, SGSN 154 and MSC 156 may each also include a respective processor, a respective memory element and/or a respective storage. NodeB 140 may additionally include at least one transmitter, at least one receiver and at least one antenna to facilitate over-the-air (OTA) communications. Hence, appropriate software, hardware and/or algorithms are being provisioned in HNB 110, HNB 112, HNB-X, HNB-Y, HNB-Z, SeGW 114, SeGW 116, SeGW-A, SeGW-B, HNB-GW 118, HNB-GW 120, HNB-GW-A, HNB-GW-B, RMS 122, SON server 152, NodeB 140, RNC 142, SGSN 154 and/or MSC 156 in order to facilitate various operations as described for various embodiments discussed herein to facilitate HNB-GW redundancy in a network environment. Note that in certain examples, certain databases or storage (e.g., for storing information associated with facilitating HNB-GW redundancy) can be consolidated with memory elements (or vice versa), or the storage can overlap/exist in any other suitable manner.

In one example implementation, HNB 110, HNB 112, HNB-X, HNB-Y, HNB-Z, SeGW 114, SeGW 116, SeGW-A, SeGW-B, HNB-GW 118, HNB-GW 120, HNB-GW-A, HNB-GW-B, RMS 122, SON server 152, NodeB 140, RNC 142, SGSN 154 and/or MSC 156 are network elements, which are meant to encompass network appliances, servers, routers, switches, gateways, bridges, loadbalancers, firewalls, processors, modules, or any other suitable device, component, element, or object operable to exchange information that facilitates or otherwise helps to facilitate various operations as described for various embodiments discussed herein to facilitate HNB-GW redundancy in a network environment (e.g., for networks such as those illustrated in FIGS. 1, 2A and 2B). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms, communication protocols, interfaces and/or standards, proprietary and/or non-proprietary that allow for the effective exchange of data or information.

In various embodiments, HNB 110, HNB 112, HNB-X, HNB-Y, HNB-Z, SeGW 114, SeGW 116, SeGW-A, SeGW-B, HNB-GW 118, HNB-GW 120, HNB-GW-A, HNB-GW-B, RMS 122, SON server 152, NodeB 140, RNC 142, SGSN 154 and/or MSC 156 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to HNB 110, HNB 112, HNB-X, HNB-Y, HNB-Z, SeGW 114, SeGW 116, SeGW-A, SeGW-B, HNB-GW 118, HNB-GW 120, HNB-GW-A, HNB-GW-B, RMS 122, SON server 152, NodeB 140, RNC 142, SGSN 154 and/or MSC 156 could be provided in any database, register, control list, cache, or storage structure: all of which can be referenced at any suitable timeframe. Any such storage options may be included within the broad term 'memory element' as used herein. Similarly, any of the potential processing elements, modules, controllers, and machines described herein should be construed as being encompassed within the broad term 'processor'. Each of the network elements and/or user equipment can also include suitable interfaces for receiving, transmitting, and/or otherwise communicating data or information in a network environment.

Note that in certain example implementations, the operations as outlined herein to facilitate HNB-GW redundancy may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 4A-4C] can store data used for the operations described herein. This includes the memory elements being able to store software, logic, code, or processor instructions that are executed to carry out the activities described herein. A processor (e.g., a hardware processor) can execute any type of instructions associated with data to achieve the operations detailed herein. In one example, the processors [as shown in FIGS. 4A-4C] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executables.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method comprising:
configuring a Home Node B (HNB) with a first Radio Network Controller Identifier (RNC ID) and a second RNC ID, wherein the first RNC ID is associated with a primary HNB gateway (HNB-GW) and the second RNC ID is associated with a secondary HNB-GW;
broadcasting a first UTRAN (Universal Mobile Telecommunications System (UMTS) Terrestrial Radio Access Network) cell ID (UC-ID) by the HNB while the HNB is served by a first HNB-GW, wherein the first UC-ID includes the first RNC ID; and in response to the HNB losing connectivity with the primary HNB-GW:
reparenting the HNB to the secondary HNB-GW;
switching the broadcasting by the HNB from the first UC-ID to a second UC-ID that includes the second RNC ID;
replacing, on the HNB, the first RNC ID with a third RNC ID associated with a tertiary HNB-GW; and
communicating by the HNB to a Self-Organizing Network (SON) server, that the HNB has reparented from the primary HNB-GW to the secondary HNB-GW.

2. The method of claim 1, wherein the secondary HNB-GW is identified as a backup HNG-GW from a plurality of HNB gateways based on a weight factor assigned to the secondary HNB-GW.

3. The method of claim 1, wherein a HNB cell ID of the HNB is unchanged when the HNB is served by the secondary HNB-GW from the HNB cell ID from when the HNB was served by the primary HNB-GW.

4. The method of claim 1, further comprising:
configuring the HNB with a plurality of HNB-GW Internet Protocol (IP) addresses, wherein each HNB-GW IP address of the plurality of HNB-GW IP addresses is associated with one HNB-GW of a plurality of HNB-GWs; and
configuring the HNB with a plurality of Security Gateway (SeGW) IP addresses, wherein each SeGW IP address of the plurality of SeGW IP addresses is associated with one SeGW of a plurality of SeGWs and wherein each HNB-GW of the plurality of HNB-GWs is associated to each SeGW of the plurality of SeGWs to form redundant gateway pairs to serve the HNB.

5. The method of claim 4, wherein configuring the HNB with the first RNC ID and the second RNC ID, configuring the HNB with the plurality of HNB-GW IP addresses and configuring the HNB with the plurality of SeGW IP addresses is performed by a Radio Access Network (RAN) Management System (RMS).

6. The method of claim 1, wherein configuring the HNB with the first RNC ID and the second RNC ID further comprises one of:
configuring the HNB with the first UC-ID and the second UC ID; and
configuring the HNB with the first RNC ID and the second RNC ID and a HNB Cell ID corresponding to an identity of the HNB.

7. The method of claim 1, further comprising:
communicating the second UC-ID to the SON server upon the HNB switching its broadcasting; and
updating neighbor information for one or more macro cell radios that neighbor the HNB based on the second UC-ID.

8. The method of claim 7, wherein the updating is performed only when the HNB is designated as an entry point to a building.

9. One or more non-transitory tangible media encoding logic that includes instructions for execution that when executed by a processor, is operable to perform operations comprising:
configuring a Home Node B (HNB) with a first Radio Network Controller Identifier (RNC ID) and a second RNC ID, wherein the first RNC ID is associated with a primary HNB gateway (HNB-GW) and the second RNC ID is associated with a secondary HNB-GW;
broadcasting a first UTRAN (Universal Mobile Telecommunications System (UMTS) Terrestrial Radio Access Network) cell ID (UC-ID) by the HNB while the HNB is served by a first HNB-GW, wherein the first UC-ID includes the first RNC ID; and
in response to the HNB losing connectivity with the primary HNB-GW:
reparenting the HNB to the secondary HNB-GW;
switching the broadcasting by the HNB from the first UC-ID to a second UC-ID that includes the second RNC ID;
replacing, on the HNB, the first RNC ID with a third RNC ID associated with a tertiary HNB-GW; and
communicating by the HNB to a Self-Organizing Network (SON) server, that the HNB has reparented from the primary HNB-GW to the secondary HNB-GW.

10. The media of claim 9, the operations further comprising:
selecting the secondary HNB-GW as a backup HNG-GW from a plurality of HNB gateways based on a weight factor assigned to the secondary HNB-GW.

11. The media claim 9, wherein a HNB cell ID of the HNB is remains the HNB cell ID that the HNB is served by the first HNB-GW when the HNB is served by the second HNB-GW.

12. The media of claim 9, the operations further comprising:
configuring the HNB with a plurality of HNB-GW Internet Protocol (IP) addresses, wherein each HNB-GW IP address of the plurality of HNB-GW IP addresses is associated with one HNB-GW of a plurality of HNB-GWs; and
configuring the HNB with a plurality of Security Gateway (SeGW) IP addresses, wherein each SeGW IP address of the plurality of SeGW IP addresses is associated with one SeGW of a plurality of SeGWs and wherein each HNB-GW of the plurality of HNB-GWs is associated to each SeGW of the plurality of SeGWs to form redundant gateway pairs to serve the HNB.

13. The media of claim 9, wherein configuring the HNB with the first RNC ID and the second RNC ID further comprises one of:
configuring the HNB with the first UC-ID and the second UC-ID; and
configuring the HNB with the first RNC ID and the second RNC ID and a HNB Cell ID corresponding to an identity of the HNB.

14. The media of claim 9, the operations further comprising:
communicating the second UC-ID to the SON server upon the HNB switching its broadcasting; and
updating neighbor information for one or more macro cell radios that neighbor the HNB based on the second UC-ID.

15. A system, comprising:
a memory element for storing data; and
a processor that executes instructions associated with the data, wherein the processor and the memory element cooperate such that the system is configured for:
configuring a Home Node B (HNB) with a first Radio Network Controller Identifier (RNC ID) and a second RNC ID, wherein the first RNC ID is associated with a primary HNB gateway (HNB-GW) and the second RNC ID is associated with a secondary HNB-GW;
broadcasting a first UTRAN (Universal Mobile Telecommunications System (UMTS) Terrestrial Radio Access Network) cell ID (UC-ID) by the HNB while the HNB is served by a first HNB-GW, wherein the first UC-ID includes the first RNC ID; and in response to the HNB losing connectivity with the primary HNB-GW:
reparenting the HNB to the secondary HNB-GW;
switching the broadcasting by the HNB from the first UC-ID to a second UC-ID that includes the second RNC ID;
replacing, on the HNB, the first RNC ID with a third RNC ID associated with a tertiary HNB-GW; and
communicating by the HNB to a Self-Organizing Network (SON) server, that the HNB has reparented from the primary HNB-GW to the secondary HNB-GW.

16. The system of claim 15, wherein the system is further configured for:
selecting, the secondary HNB-GW as a backup to the primary HNB-GW from a plurality of HNB gateways based on a weight factor assigned to the secondary HNB-GW.

17. The system of claim 15, wherein a HNB cell ID of the HNB is unchanged when the HNB is served by the primary HNB-GW from the HNB cell ID of the HNB from when the HNB was served by the primary HNB-GW.

18. The system of claim 15, wherein the system is further configured for:
configuring the HNB with a plurality of HNB-GW Internet Protocol (IP) addresses, wherein each HNB-GW IP address of the plurality of HNB-GW IP addresses is associated with one HNB-GW of the plurality of HNB-GWs; and
configuring the HNB with a plurality of Security Gateway (SeGW) IP addresses, wherein each SeGW IP address of the plurality of SeGW IP addresses is associated with one SeGW of a plurality of SeGWs and wherein each HNB-GW of the plurality of HNB-GWs is associated to one unique SeGW of the plurality of SeGWs to form redundant gateway pairs to serve the HNB.

19. The system of claim 18, wherein configuring the HNB with the first RNC ID and the second RNC ID, configuring the HNB with the plurality of HNB-GW IP addresses and configuring the HNB with the plurality of SeGW IP addresses is performed by a Radio Access Network (RAN) Management System (RMS).

20. The system of claim 15, wherein configuring the HNB with the first RNC ID and the second RNC ID further comprises one of:
configuring the HNB with the first UC-ID and the second UC-ID; and
configuring the HNB with the first RNC ID and the second RNC ID and a HNB Cell ID corresponding to an identity of the HNB.

* * * * *